United States Patent [19]

Sano et al.

[11] 4,225,779

[45] Sep. 30, 1980

[54] BANKING APPARATUS AND METHOD

[75] Inventors: Jyunji Sano, Ohtsu; Kuniaki Okazaki, Moriyama, both of Japan

[73] Assignee: Omron Tateisi Electronics Co., Kyoto, Japan

[21] Appl. No.: 912,739

[22] Filed: Jun. 5, 1978

[30] Foreign Application Priority Data

Jun. 10, 1977 [JP] Japan ................................ 52/69234
Jun. 10, 1977 [JP] Japan ................................ 52/69235

[51] Int. Cl.³ ........................ G06K 17/00; G06F 15/30
[52] U.S. Cl. ...................................... 235/379; 364/900
[58] Field of Search ... 364/900 MS File, 200 MS File, 364/408; 235/379; 340/149 A, 152 R

[56] References Cited

U.S. PATENT DOCUMENTS

| | | | |
|---|---|---|---|
| 3,845,277 | 10/1974 | Voss et al. | 235/379 |
| 3,937,925 | 2/1976 | Boothroyd | 235/379 |
| 3,970,992 | 7/1976 | Boothroyd et al. | 340/149 A |

FOREIGN PATENT DOCUMENTS 1407660 3/1973 United Kingdom .

*Primary Examiner*—Raulfe B. Zache
*Attorney, Agent, or Firm*—Stevens, Davis, Miller & Mosher

[57] ABSTRACT

Banking apparatus comprising a plurality of transaction devices having at least one common operative device, means for presetting a pattern of transactions representing a combination of transactions processable according to a status of the transaction devices, means connected with the means for presetting the pattern of transactions for generating a first predetermined signal pattern, means for entering a customer selected transaction into the apparatus, means connected with the means for entering for generating a second predetermined signal, means for checking for the presence or absence of a predetermined relation between the first and second predetermined signal patterns and for judging whether a customer selected transaction is available and means for executing a customer selected transaction which has been judged to be available by the judging means.

13 Claims, 7 Drawing Figures

BANKING APPARATUS AND METHOD

BACKGROUND OF THE INVENTION

1. Field of the Invention

The present invention relates to a banking system including a plurality of transaction function devices accommodated in a single console-type unit and, more particularly, to a banking system which comprises a common housing accommodating a plurality of transaction devices having at least one common operative portion, that is, a common operative device, means for presetting a pattern of transaction modes representing a combination of available transactions which is dictated by the status of the transaction devices, means connected with the means for presetting the pattern of transactions for generating a first predetermined pattern of signal, means for entering a customer selected transaction into the apparatus, means connected with the means for entering for generating a second predetermined signal pattern, means for checking for the presence or absence of a predetermined relation between the first and second predetermined signal patterns and for judging therefrom whether a customer selected transaction is available and means for executing a customer selected transaction which has been judged to be available by the judging means.

BRIEF DESCRIPTION OF THE PRIOR ART

Modern banking systems each include, among other things, a cash dispenser capable of dispensing cash to customers, an automatic money exchanger capable of issuing customer-selected kinds of bank notes in exchange for the corresponding amount tendered and an automatic deposit machine capable of depositing money in the customer's account. It is well known that banking systems have contributed considerably to improved efficiency and expanded services in banks and other institutions. However, the installation of a large number of banking machines, each performing one of several available services, not only is costly but also requires a large floor space. To avoid this disadvantage, an attempt has been made to combine a plurality of transaction devices in a single unit with a common device performing functions common to the transaction devices. Such an arrangement obviously reduces machine costs and installation space. By way of illustration, it is then possible to utilize a mechanism for cash dispensing in common with that of an automatic money exchanger; a bank note checker in common with the corresponding mechanism of an automatic banknote exchanger and an automatic depositor; or a certain portion of a bankbook printer in common with the corresponding portion of an automatic cash disperser or/and an automatic depositor, thus making a single transaction unit discharge a plurality of transactions. While it is likely to be less costly to use an integrated banking system like the one briefly described above for a plurality of transactions, e.g. cash dispensing, cash exchanging and depositing, than to use a plurality of independent transaction machines, such a multiple-function machine has the disadvantage that a purely local malfunction in the system could result in a complete shutdown of the entire service package.

Another disadvantage of such a multiple-function banking system is that all transactions are offered or withdrawn as a package. Thus, it is impossible to offer one or several transactions only, with the other transactions being shut down, in accordance with a definite time schedule which, in fact, is a feature of modern banking. Thus, for example, it may be convenient to offer a deposit transaction after regular work hours for the employees of the bank. Or it may be desirable that the deposit transaction be available from 9:00 a.m. to 15:00 p.m. with all the other transactions being available from 9:00 a.m. through 17:00 p.m.

SUMMARY OF THE INVENTION

It is, therefore, a primary object of this invention to provide a packaged banking system wherein a pattern of transactions selected from a plurality of available transactions may be pre-selected.

It is another object of this invention to provide a packaged banking system including means for judging whether the transaction selected by a customer is among the transactions so pre-set, for example by a bank employee, and allowing the customer-selected transaction to proceed when the particular transaction is among the pre-set transactions.

It is still another object of this invention to provide a packaged banking system such that, should any particular transaction be made unavailable by a machine malfunction or other event, it is still capable of executing transactions other than the transaction or transactions which are unavailable.

It is another yet object of this invention to provide a packaged banking system capable of carrying out each transaction according to a predetermined banking service time schedule.

It is still another object to provide a method of carrying out a plurality of transactions which comprises the steps of predeterming an available transaction or set of transactions and judging whether the transaction selected by a customer is available or not.

According to one aspect of this invention, a banking system has a single console-type unit accommodating a plurality of transaction function devices with at least one common functional device, said system comprising means for pre-setting a pattern of transactions representing a combination of transactions processable according to a status of said transaction devices, means operatively associated with said means for presetting said pattern of transactions and adapted to generate a first predetermined signal pattern, means for entering a customer selected transaction into said apparatus, means for generating a second predetermined signal pattern, means for checking for the presence or absence of a predetermined relation between said first and second predetermined signal patterns and for judging whether said customer selected transaction is available and means for executing a customer selected transaction which has been judged to be available by said judging means.

Other objects as well as the numerous advantages of the banking system according to this invention will become apparent from the following detailed description of the invention and the accompanying drawings in which.

DETAILED DESCRIPTION OF THE PREFERRED EMBODIMENTS

Figure 1:
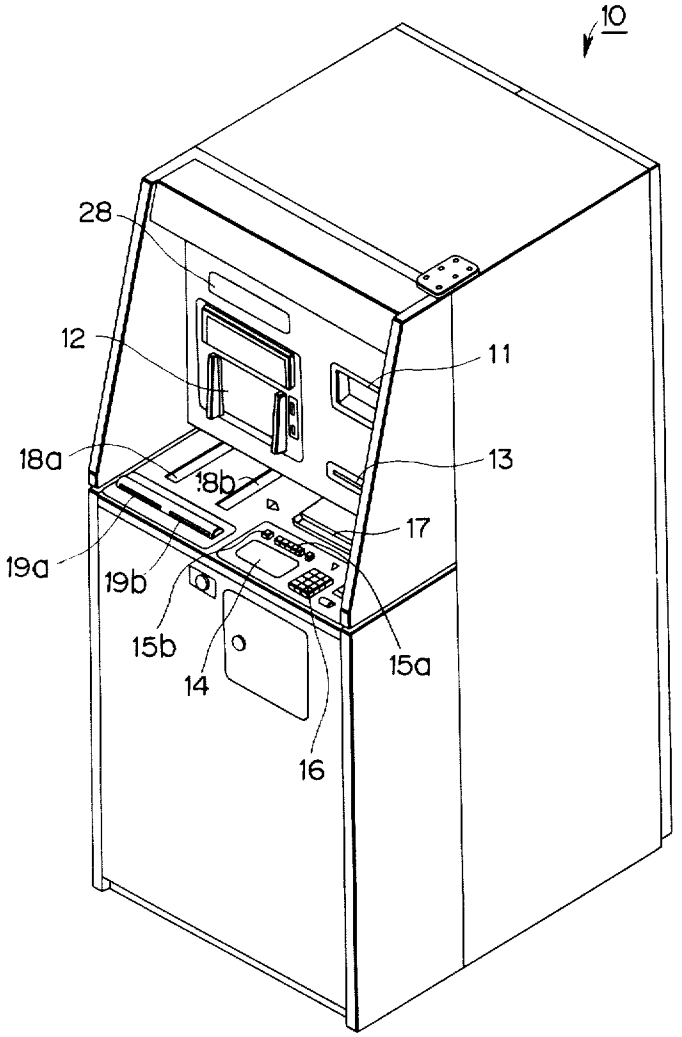
FIG. 1 is a pictorial view showing a free-standing banking apparatus embodying the principles of this invention.

Referring, now, to FIG. 1, there is shown a multiple-function banking apparatus embodying the principles of this invention. This multiple-function banking system is designed, for example, to function as an automatic over-the-counter service package which includes a plurality of transactions. Thus, the system includes such transactions as cash dispensing, cash exchanging, depositing, balance reference and bankbook entry. The front panel of the banking apparatus 10 is provided with a gate 11 which accepts a magnetic card carrying such data as the personal code of a person who is eligible for transactions, an inlet 12 for inserting a bank note, an outlet 13 for issuing a receipt in the case of a transaction without a bankbook, and a rotatable how-to-use instruction display 28 which displays the method of operating the apparatus for each transaction mode of the banking system.

The operation panel of the banking apparatus 10 is provided with a display 14 which displays key-entered numerical information, a transaction selection button keyboard **15*a* by which the customer may select the transaction he wants to do with the bank from among a plurality of, five in the illustrated embodiment, transaction modes, a confirmation button 15*b*, a ten-key keyboard 16 (marked 0 to 9) for entering the customer's select number and requested withdrawl amount, a gate 17 for the insertion of a bankbook in the cash dispensing, deposit or entry mode, a confirmation window 18*a* for confirming the number of e.g. ten-dollar bills ready to be dispensed, another confirmation window 18*b* for confirming the number of, e.g. fifty-dollar bills, an outlet 19*a* for dispensing the ten-dollar bills delivered to a window 18*a* to the customer on depression of button 15*b*, and an outlet 19*b*** for similarly dispensing the fifty-dollar bills.

Disposed inside the card gate 11 is a card detecting switch 32 (FIG. 3) which detects the card inserted into the apparatus 10. Preferably, there is arranged in a bankbook gate 17 a shutter device adapted to selectively open and allow the bankbook to enter only when a personal card has been inserted and the bankbook entry mode has been selected by the customer. There also is disposed, either inside or on the backside of apparatus 10, an operation mode pre-setting switch 25 in which the pattern of available transactions is set according to either the status of the transaction devices and/or a predetermined banking time schedule. Before proceeding to a more detailed description of the banking system according to the invention, each transaction mode thereof will be briefly explained.

(1) CASH WITHDRAWAL MODE

The cash withdrawal mode involves the following sequence of events. First, the customer inserts a magnetic card including data such as his personal code and secret number into the gate 11. He then inserts his bankbook into the gate 17 if he wants to have a withdrawal amount entered into the bankbook. Then, he selects the cash withdrawal mode by means of selection button keyboard **15*a*. The customer enters his secret number identifying his authority to use the card and the amount he wants to withdraw on the ten-key keyboard 16. If the key-entered secret number corresponds to his individualized secret number read from the card and the amount he wants to withdraw is not in excess of the outstanding balance in his account, bank notes in a value equivalent to the amount he wants to withdraw are conveyed to the confirmation window 18*a* and/or 18*b*. The customer checks to see that the bank notes appearing in the window 18*a* and/or 18*b* are in agreement with those he requested and, if the result of this inspection is affirmative, he depresses the confirmation button 15*b*. In response to this depression of button 15*b*, the inserted card is returned to the customer through the card gate 11, the requested bank notes are dispensed through the ten-dollar bill outlet 19*a* and/or fifty-dollar bill outlet 19*b* and the bankbook, if it has been entered, is returned to the customer through the bankbook gate 17**.

(2) DEPOSIT MODE

The deposit mode involves the following sequence of events. The customer inserts his card into the card gate 11 and selects the deposit mode on the transaction selection button keyboard **15*a*. In response to the depression of the correct button, the shutter disposed in the throat of the bankbook gate 17 opens to admit the bankbook. The customer then inserts bank notes in the value which he wants to deposit into the banknote inlet 12, whereupon the value of the banknotes is displayed on the display 14. He then enters his secret number by means of keyboard 16**, if necessary. The amount is entered into the bankbook only when the secret number agrees with the number read from the card. The bankbook and the card are then returned to the customer.

(3) EXCHANGE MODE

The exchange mode involves the following sequence of events. The customer inserts his card into the gate 11 and, then, selects the exchange mode on the transaction selection button keyboard **15*a*. He then inserts a bank note to be exchanged, for example a fifty-dollar-bill, into the banknote inlet 12. Thereupon, the value is displayed on the display 14 and the small changes (five ten-dollar bills) are conveyed to the confirmation window 18*a*. The customer inspects the ten-dollar bills and, if the value represented by these bills is equal to that of the bank note tendered in exchange, he depresses a confirmation button 15*b*, whereupon the ten-dollar bills are dispensed from dispenser outlet 19*a***.

(4) BALANCE REFERENCE MODE

The balance reference mode involves the following sequence of events. The customer inserts his magnetic card into the card gate 11 and selects the balance reference transaction mode by means of button **15*a*. Then, if the customer desires to check the balance, he enters his secret number on the ten-key board 16. When the secret number magnetically recorded on the card agrees with the key-input number, the balance of his deposit account is displayed on the display 14. It may also be so arranged that a slip imprinted with the balance is issued through a receipt issue outlet 13** when the balance is displayed. The card is returned to the customer.

(5) ENTRY MODE

The entry mode involves the following sequence of events. The customer selects the entry mode on the transaction selection button keyboard 15. Of course, he must insert his card into the gate 11 beforehand. As the button 15 is depressed, the shutter adjacent the back-note gate 17 opens, thus activating the acceptance of the bankbook. When the bankbook has thus been accepted, the information on any past transactions made without entries in the bankbook, such as automatic transfer transactions, is printed and the updated bankbook is then returned to the customer.

The five transaction modes briefly described above are merely illustrative of the variety of banking services which may be rendered by the apparatus and method of this invention and should not be construed as meaning that the invention is limited to those particular transaction modes.

Figure 2:
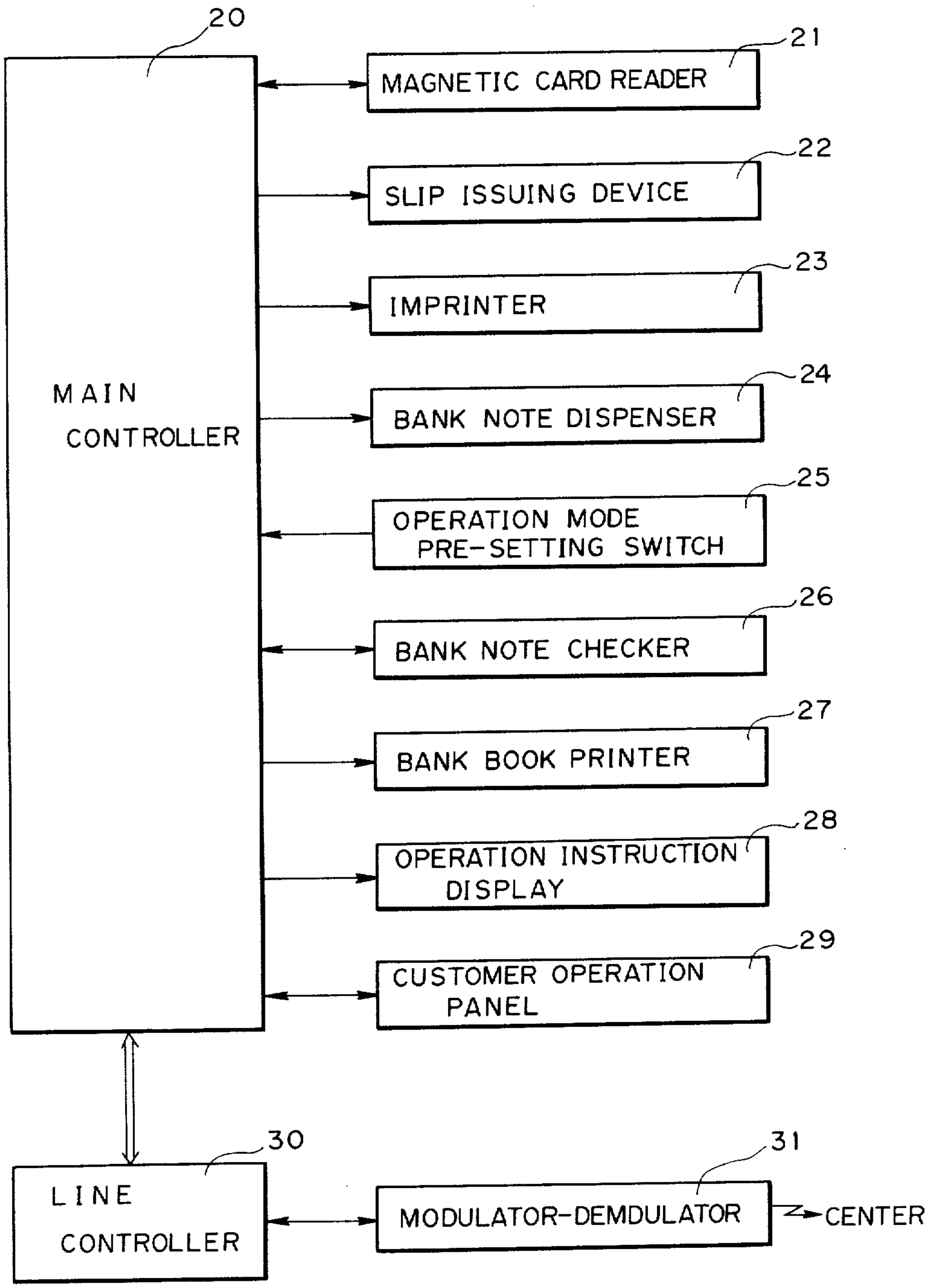
FIG. 2 is a block diagram of a banking system according to this invention.

Referring, now, to FIG. 2, there is shown a block diagram of one embodiment of this invention. In association with a main controller segment 20, there are provided a magnetic card reader 21 which is disposed behind the card gate 11 and adapted to read the magnetically recorded information, i.e. the secret number or personal code, from the magnetic card, a slip issue device 22 which records each mode of transaction and details of the transaction such as the requested amount of withdrawal or the depositing amount for posting in the bank's reference and evidence files, an imprinter 23 adapted to prepare and issue to the customer a receipt or evidence slip relevant to the transaction, a bank note dispenser 24 which dispenses bank notes equivalent to the withdrawal amount or exchanged amount into the confirmation window 18*a* or 18*b*, an operation mode pre-setting switch 25 which is adapted to change the processable pattern of transactions according to the status of the banking apparatus, a bank note checker 26 which verifies the kind of the bank note (for example, ten-dollar bill or fifty-dollar bill) inserted from the inlet 12, a bankbook printer 27 which prints deposit amounts on the deposit mode or make entries updating the bankbook on the entry mode, a rotatable how-to-use display device 28 disposed on the front panel of the apparatus 10 and adapted to display a how-to-use instruction for each transaction mode, and a customer operating panel 29 which includes a transaction selection keyboard 15*a*, the confirmation button 15*b* and the ten-key keyboard 16. The main controller 20 transmits transaction processing data to a control center through a line controller 30 and a modulator-demodulator 31 and receives input data (for example, the information not recorded yet in the bankbook) from the center through the modulator-demodulator 31 and the line controller 30.

Figure 3:
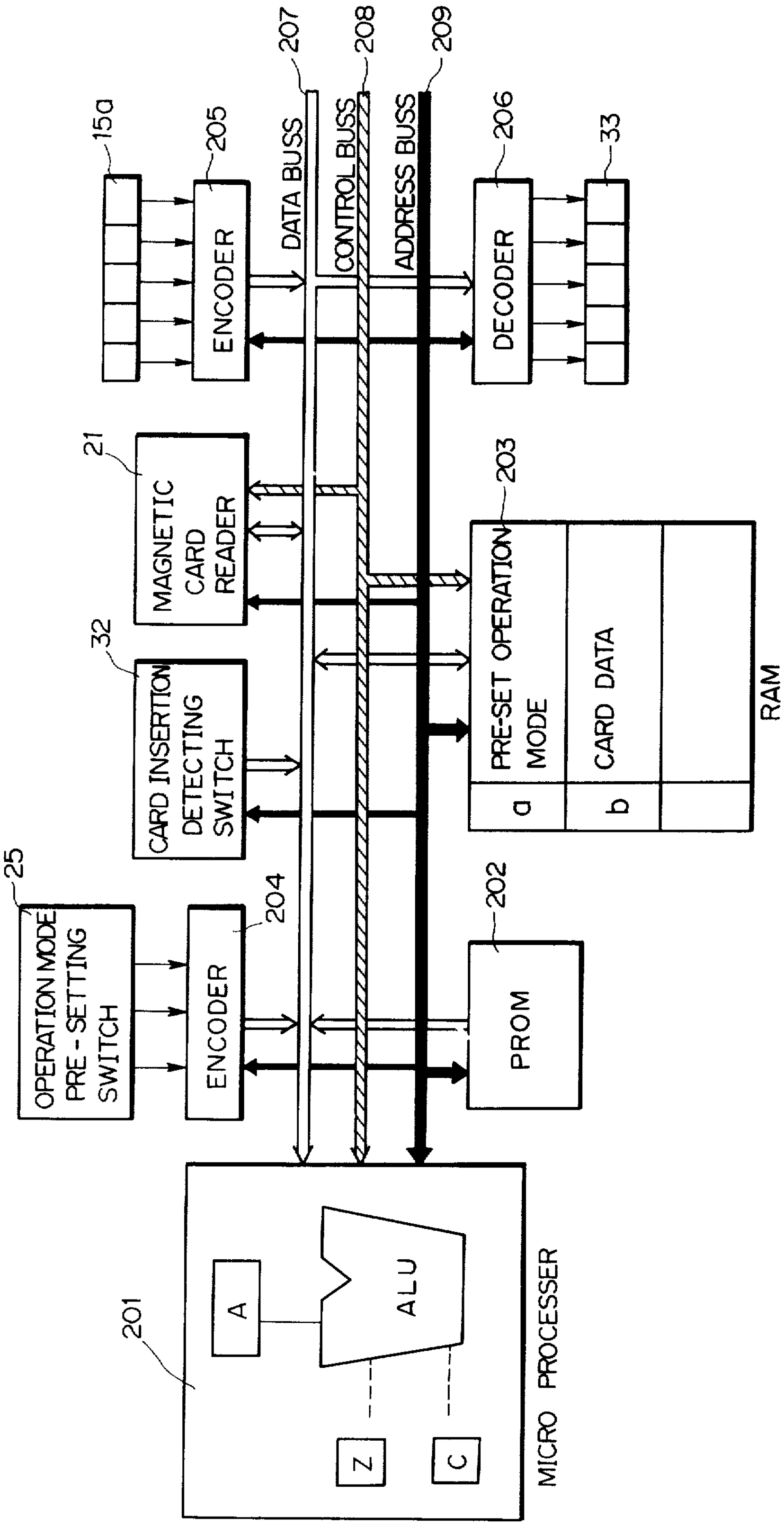
FIG. 3 is a block diagram of a main controller used in the banking apparatus of this invention.

FIG. 3 is a detailed block diagram of the main controller 20. The main controller 20 comprises a micro-processor 201 which performs various operations and control processes, a read-only memory PROM 202 which is pre-loaded with the program of this embodiment which is hereinafter described in detailed with reference to the flow diagram of FIG. 5, a random-access memory RAM 203 which records and reads transaction process data, an encoder 204 which encodes a output from the operation mode pre-setting switch 25 and provides the micro-processor with the encoded signal, an encoder 205 which encodes an output designating a selected transaction mode from the transaction selection button 15*a* and provides the micro-processor 201 with the encoded selected transaction mode output signal, a decoder 206 which drives a display 33, a data bus 207 which transmits transaction data to the micro-processor 201 or distributes micro-processor output data to various parts of the apparatus, a control bus 208 which transmits a control signal for reading and recording functions and an address bus 209 which provides the read-only memory 202 and random access memory 203 with address data and controls a read-out gate of each switch. The data bus 207 and the control bus 208 are connected with the card detecting switch 32 for detecting the card inserted into the gate 11 and the card reader 21, respectively. To the decoder 206 is applied the information on the transaction mode selected by means of the selection button 15*a*, and a signal for actuating an available-transaction indicating lamp 33 corresponding to the particular transaction is supplied to the display. The micro-processor 201 includes an arithmetic logic unit ALU which performs operations in accordance with the program data stored in the read-only memory 202, an accumulator A which temporally stores certain data, a flag Z which memorizes the fact that the result of an operation by said accumulator A is zero, and a flag C which memorizes the occurrence of a carry-up in accumulator A.

Now, some operable transaction modes in the event of a local malfunction of the system will be explained. Let it now be assumed that a bank note dispenser 24 has failed and ceased to issue bank notes (i.e. a jam). Then, the cash withdrawal and exchange modes will become unoperable. In the event of a failure of a bank note checker 26 for verifying the kind of an inserted bank note due to a jam or a severed belt, for instance, both the exchange and the deposit modes will become unoperable. If a bankbook printer 27 fails, the cash withdrawal, deposit and entry modes will all become inoperative.

In accordance with this invention, a bank employee may pre-set the available transaction modes according to the customer service schedule of the bank, i.e. the transaction modes available to the customer during a certain calendar time of the day. This pre-setting may be conveniently performed by operating the pre-setting switch 25 manually. As an alternative, an automatic detector for detecting a system failure, i.e. a failure of a certain transaction function, may be built into, or associated with, said pre-setting switch so that the system may remain operable with regard to the remainder of the functions, i.e. all the transaction modes offered except the mode or modes affected by such a failure as described above. The principle will now be explained which is involved in the detection of operable transaction modes in the event of a failure.

Figure 4:
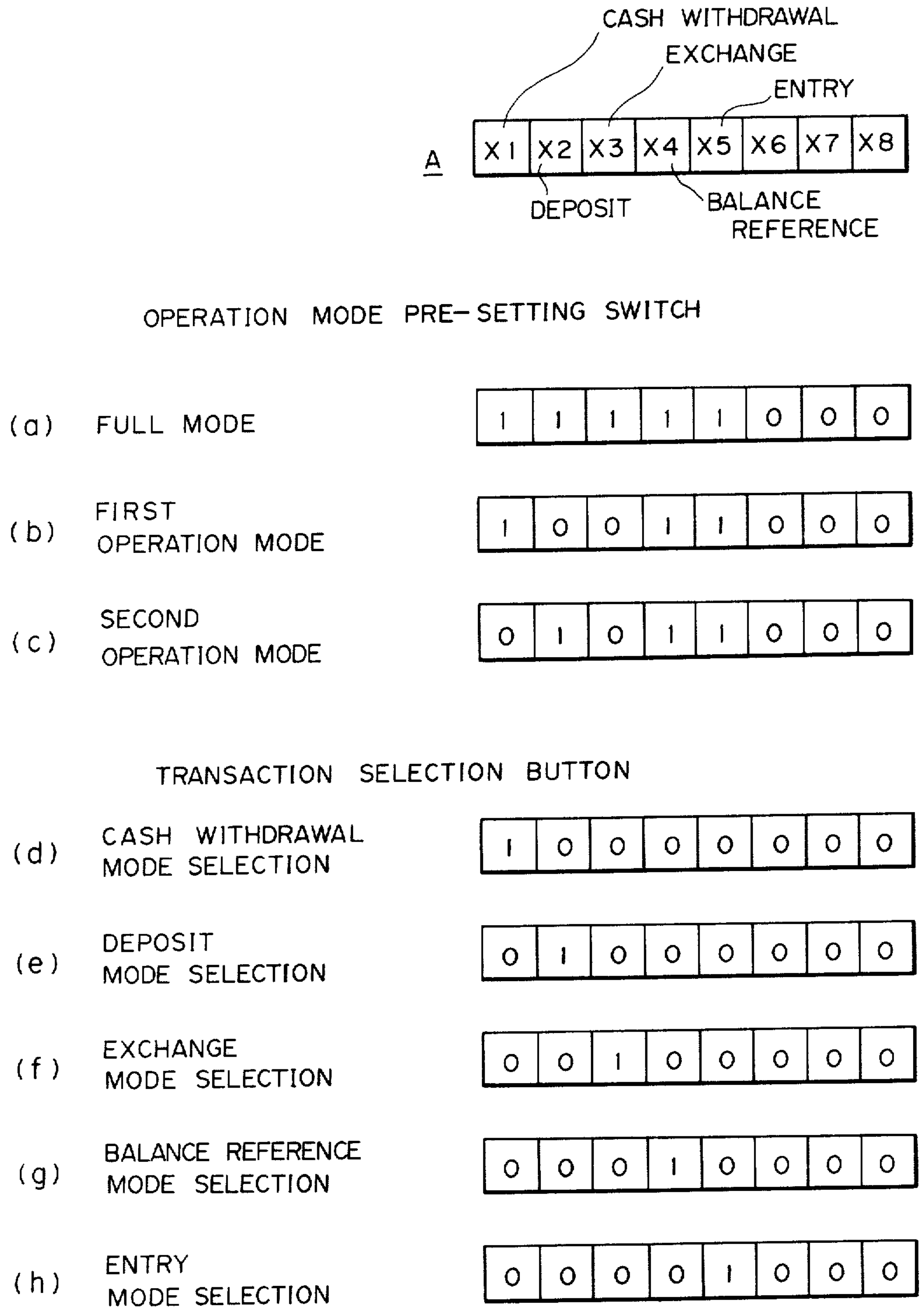
FIG. 4 is a diagrammatic view showing a logic format for an accumulator used in the banking apparatus of this invention.

FIG. 4 is a schematic representation of an exemplary set of information stored in the accumulator A. In this example, accumulator A has 8 bits, namely X1 through X8. The memory of the available transaction modes set by pre-setting switch 25 and the logic state as designated by transaction selection button 15 are shown in tandem for each of understanding. The first bit (X1) of accumulator A stores a logic signal specifying the presence or absence of a withdrawal mode input as selected by the pre-setting switch 25 or selected by the transaction selection switch 15*a*; the second bit (X2) similarly stores a logic signal specifying the depository mode; the third bit (X3) stores a logic signal specifying the exchange mode, the fourth bit (X4) stores a logic signal specifying the balance reference mode; and the fifth bit (X5) stores a logic signal specifying the bankbook entry mode. Thus, each bit specifies a transaction mode by memorizing a logic "1", and also specifies, by memorizing a logic "0", that the particular mode is not pre-set or is not selected.

Now, as the pre-setting switch 25 is actuated to set a pattern indicating that the entire system 10 is valid or normal, an encoder 204 generates a coded signal "11111000" and lets the accumulator A store the information that all the modes are valid and available to the customer. FIG. 4(*a*) shows the logic state of the accumulator A which has memorized this coded signal representing the availability of all the modes. If the bank note checker 26 has failed, the encoder 204 generates a coded signal "10011000" meaning that the cash withdrawal, balance reference and bankbook entry modes are still available to the customer and lets the accumulator store that information. FIG. 4(*b*) shows the logic state of accumulator A in this situation. If the transaction mode pre-setting switch 25 is actuated to set a failure of the bank note dispenser, the encoder 204 generates a coded signal "01011000" designating that the deposit, balance reference and entry modes are available to the customer and lets the accumulator A store the information. The logic state of accumulator A in this situation is schematically shown in FIG. 4(*c*).

On the other hand, if the customer actuates the selection button 15*a* to designate the kind of transaction he desires to consummate with the bank, the encoder 205 generates a coded signal including a logic of "1" in the digit corresponding to the transaction he is requesting and lets the accumulator A store the information temporally. The logic states of accumulator A for the modes that may be designated by the transaction selection button 15*a* are shown in FIG. 4(*d*) through (*h*).

Figure 5:
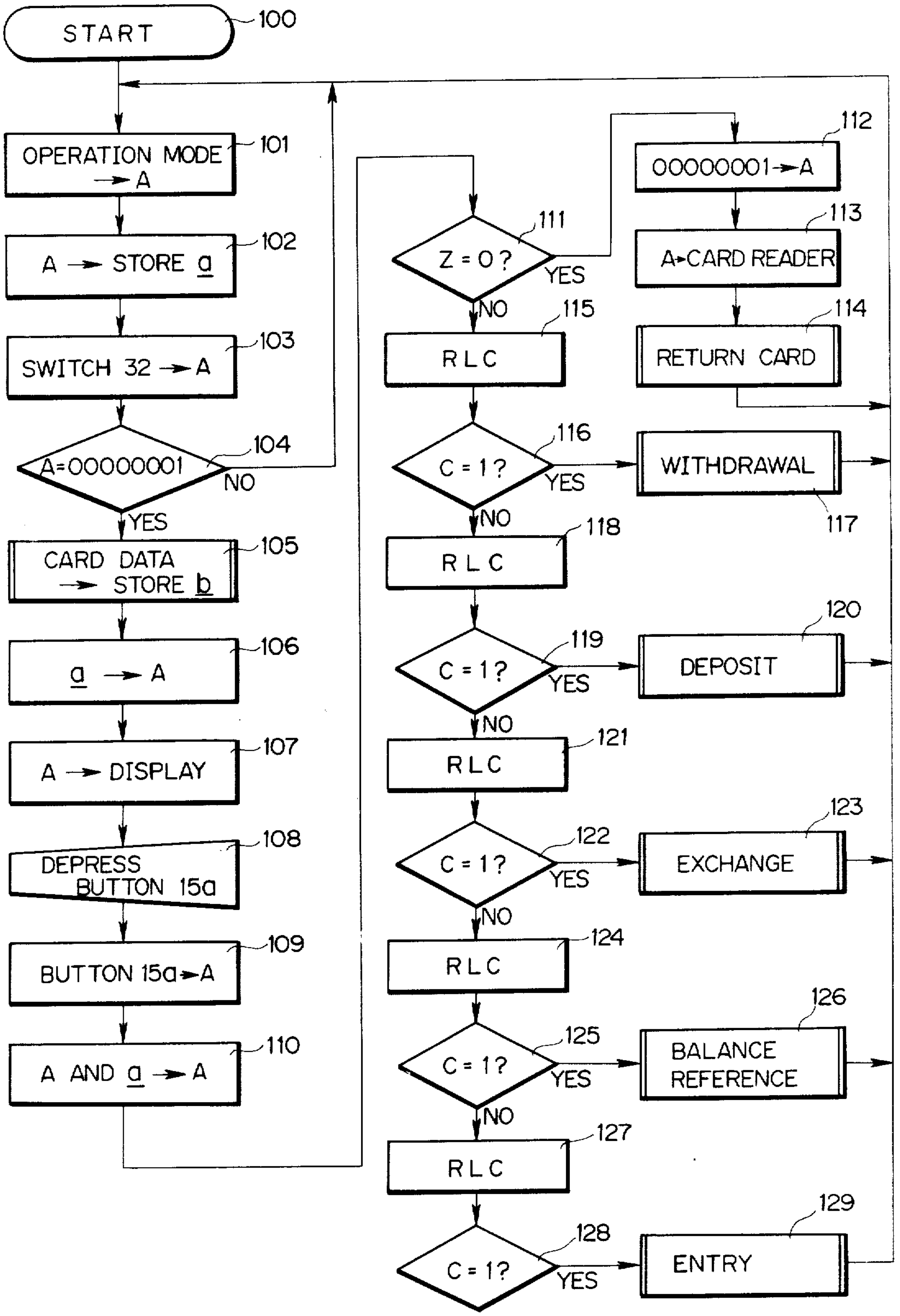
FIG. 5 is a detailed flow diagram of a banking system embodying the principles of this invention.

FIG. 5 is a flow diagram illustrating the functioning of an embodiment of this invention. Referring, now, to FIGS. 1 through 5, the operation of judging whether any of the multiple functions of the banking apparatus 10 is operable or not is illustrated. If a certain mechanical failure has developed in the banking apparatus, the bank employee in charge of the apparatus may manually set the operable modes by means of the pre-setting switch 25. As previously discussed, a self-check, self-correction function may be built into the banking apparatus. In the former case, the system 10 warns the employee that something is wrong with the machine. The employee checks the machine and sets the modes which are still operable. For example, if the bank note checker 26 fails to function properly, the cash withdrawal mode, balance reference mode and entry mode are still available, although the deposit and exchange modes are not utilizable. The employee thereupon operates the pre-setting switch 25 to set a first pattern as shown in FIG. 4(*b*). Similarly, when the bank note dispenser 24 has failed, the deposit, balance reference and entry modes are still available, although the cash withdrawal and exchange modes are not available to the customer. Therefore, the employee actuates the pre-setting switch 25 to select a second pattern, whereupon the coded signal shown in FIG. 4(*c*) is read into the accumulator A. He then depresses an initiator button (not shown) to allow the following operation to start from step 100 as illustrated in FIG. 5.

In step 101, the available-mode information encoded by the encoder 204 in accordance with a pattern set by the pre-setting switch 25 is stored into the accumulator A of the micro processor 201 through the data buss 207. Namely, when the entire system 10 is in a normal condition, a logic "1" may be stored in the first bit through the fifth bit (X1 through X5), and the logic status stored in the accumulator A forms the pattern shown in FIG. 4(*a*). When the bank note checker 26 has failed, the coded signal as shown in FIG. 4(*b*) is stored into the accumulator A. When the bank note dispenser 24 has failed, the coded signal as shown in FIG. 4(*c*) is stored into the accumulator A.

In step 102, the available-mode information stored in accumulator A is memorized in a first memory area (a) of the random-access memory 203 via the data bus 207. Then, in step 103, as a card detecting switch 32 detects the insertion of a magnetic card, the logic "1" is memorized in the eighth bit (X8) of accumulator A through the data bus 207. In step 104, an inquiry is made as to whether a logic "1" has been stored in the eighth bit (X8) of accumulator A. If no card has been inserted, the eighth bit (X8) of accumulator A does not carry the logic "1" and the sequence, therefore, returns to step 101. If, on the other hand, the card has been inserted, the logic "1" is stored in the eighth bit (X8) of accumulator A. Therefore, the sequence proceeds to step 105. In step 105, magnetically recorded data are read from the card inserted from the card gate 11 and transmitted to the magnetic card reader 21, the data including the account number and secret number of the customer. This card information is applied to a second memory area (b) of said random-access memory 203 through data bus 207.

In step 106, the available-mode information stored in the first memory area (a) of random-access memory 203 is read and stored by accumulator A via data bus 207. In step 107, the available-mode information stored in the accumulator A is fed to the decoder 206 via data bus 207. The decoded signal is supplied to available-mode lamps 33, whereupon the lamps light up. For example, in the first transaction pattern mentioned above, i.e. the case in which the bank note checker 26 has failed, the lamps displaying the cash withdrawal, balance reference and entry modes are lit up. In step 108, the customer viewing the display illuminations 33 designates the desired transaction mode by operating the selection button 15*a* if the particular mode is available. In step 109, a signal representing the mode so selected by depression of the button 15*a* is fed to the encoder 205. The encoder 205 converts the mode-designating signal to a coded signal specifying the mode of transaction so designated. The coded signal is then transmitted to the accumulator A in micro-processor 201 through data bus 207. Thus, when the cash withdrawal mode has been designated by button 15*a*, the logic "1" is stored in the first bit (X1) of accumulator A; when the depository mode has been designated, the logic "1" is stored in the second bit (X2); when the exchange mode has been designated, the logic "1" is stored in the third bit (X3); when the balance reference mode has been selected by button 15*a*, the logic "1" is stored in the fourth bit (X4); or when the designated mode is bankbook entry, the logic "1" is stored in the fifth bit (X5).

In step 110, the memory bits representing the available modes stored in said first memory area (a) of random-access memory 203 are ANDed with the corresponding memory bits specifying the designated modes in the accumulator A. Thus, the results of these logic operations are fed back again to the accumulator A. If the logic "1" has been memorized in said first memory area (a) of random-access memory 203 in the bit corresponding to the bit of accumulator A where the logic "1" has been stored, the designated transaction mode is judged to be available to the customer. For this purpose, the sequence proceeds to the next step 111.

In step 111, the arithmetic logic unit ALU inquires if the flag Z is "0". If the flag Z is "0", it shows that the customer has not designated any available transaction mode yet via the selection button 15*a*. Therefore, in step 112 the logic "1" is stored in the eighth bit of accumulator A by direct instruction and, in step 113, this data in the accumulator is fed to the magnetic card reader as a card return instruction signal. In step 114, the magnetic card reader reads this signal and returns the card to the customer. The sequence now returns to step 101. Incidentally, the YES response to the enquiry in step 111 may be directly applied to step 114, bypassing steps 112 and 113. If the flag Z is judged to carry the logic "1" in step 111, it shows that the customer has selected one of the available transaction modes on the selection keyboard (button 15*a*). Thus, this transaction is processed in the following manner.

In step 115, the data in accumulator A is shifted by one bit. Then, in step 116, enquiry is made if the flag C specifying a carry-up of accumulator A is "1" or not. In other words, enquiry is made as to whether the logic "1" has been stored in the first bit of accumulator A. If a logic "1" has been stored in the first bit of accumulator A and the response to the enquiry in step 116 is affirmative, i.e. there has been a carry-up, the cash withdrawal transaction designated by the customer is executed in step 117. The function of the cash withdrawal mode has been described hereinbefore. If, in step 116, the flag C does not carry the logic "1" specifying a carry-up, the data stored in the accumulator A is further shifted to the left by one bit in step 118. Then, in step 119, enquiry is made as to if the flag C is "1". Thus, in step 119, enquiry is made if the logic "1" has been stored in the second bit (X2) of accumulator A, and if the response is affirmative, it is fed to step 120 so that the deposit mode is executed. If no logic "1" exists in flag C in step 119, the data stored in the accumulator A is shifted to the left by one bit after another to enquire if there has been a carry-up until, finally, the selected transaction is executed. After any of such transactions has been completed, the sequence returns to step 101.

In another embodiment of this invention, there may be provided an additional step between step 101 and each of steps 117, 129, 120, 123, 126 and 114, such additional steps enquiring if there is any transaction rendered unavailable by either a malfunction or an instruction from a control center, and according to the response to each such enquiry, the transaction mode presetting switch 25 is actuated.

Thus, in the several embodiments described hereinbefore, if a malfunction or abnormal event takes place in any part of the multiple-transaction apparatus, the unaffected transaction modes still viable can be selectively offered to the customer. Thus, a local malfunction does not necessitate a shut-down of the entire apparatus, thus contributing to an improved banking efficiency. Moreover, if the transaction requested by the customer is not among the pre-set modes, the transaction is automatically declined by the system, with the result that erratic or unnecessary operations may be avoided. Of course, it may also be so arranged that, in the event of such a malfunction, one of the intact transaction modes will be available to the customer.

In still another embodiment of this invention, the customer who has found a transaction unavailable may select other transaction modes. In this connection, it is preferable that he be allowed to repeat his designation several times.

While in the above embodiments, the available modes are pre-set in the event of a malfunction, it is of course possible that unavailable transaction modes are selectively pre-set.

Figure 6:
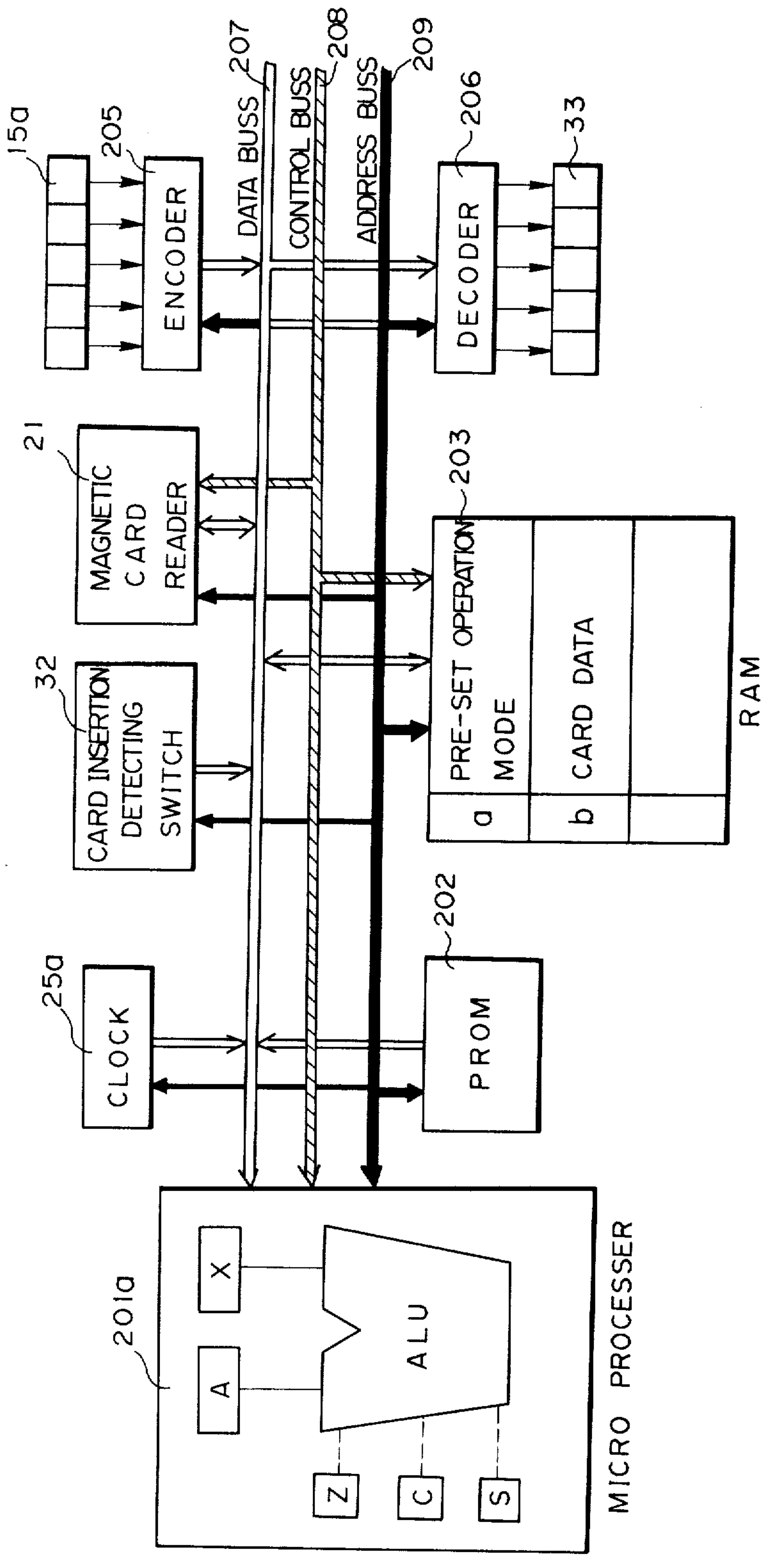
FIG. 6 is a block diagram of a main controller employed in another embodiment of this invention.
Figure 7:
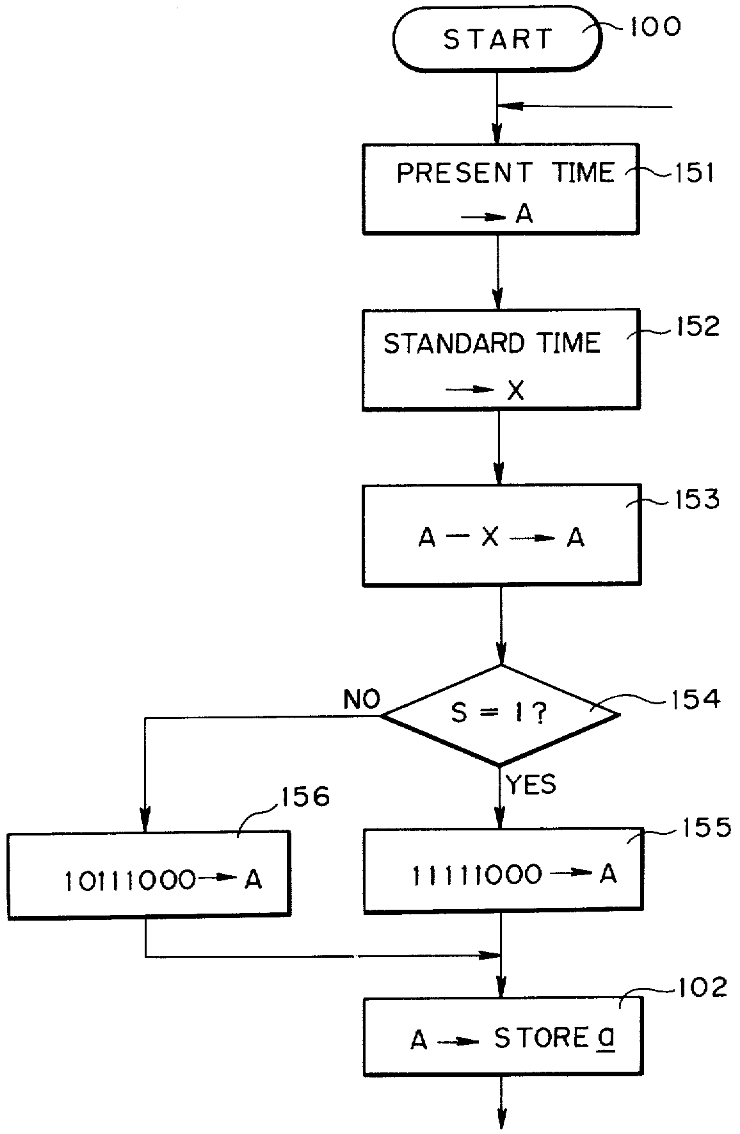
FIG. 7 is a partial flow diagram of the banking system of FIG. 6.

While the embodiments generally shown in FIGS. 2 through 5 have been explained mainly in connection with the case in which the pre-setting switch 25 is activated by or in response to a local malfunction of the system, the pre-setting of available transaction modes may be performed in accordance with a predetermined or routine banking time schedule. Thus, the switch 25 may be activated either manually by a bank employee or automatically by an instruction signal from a control center. FIGS. 6 and 7 show such an embodiment of the invention. In FIG. 6 there is shown a block diagram of a main controller in the particular embodiment. The main controller comprises a clock device 25*a* for generating a clock signal representing a current time in lieu of the pre-setting switch 25 shown in FIG. 3 and a microprocessor 201*a* in lieu of the micro-processor 201 shown in FIG. 3. The micro-processlor 201*a* comprises a register X storing a standard time, an accumulator A, an arithmetic logic unit ALU, a flag Z which stores the information that the result of an operation by accumulator A is zero, a flag C which stores a carry-up in accumulator A and a flag S which stores a logic "1" when the result of operation is minus. The main controller further comprises PROM 202, RAM 203, encoders 204 and 205 and busses 207, 208 and 209 which correspond to the parts designated by like numerals in FIG. 3. The operation sequence of this embodiment will be described by reference to FIGS. 6, 7 and 5. In a typical situation, an initiator button, not shown, is depressed by a bank employee at 9 o'clock in the morning. In step 151, the current time from clock 25 is temporally stored in the accumulator A through data bus 206. In step 152, a standard time is stored in register X, for example by a direct instruction from outside of the system. The standard time may represent a closing calendar time (15:00) for the full-mode service (9:00 to 15:00) or 17:00 for service modes other than the deposit mode (i.e. 9:00 to 17:00). This standard time information is permanently stored in the register X.

In step 153, the standard time is subtracted from the current time stored in the accumulator A and the result of this operation updates the storage of the accumulator A. In this step, if the current time (T) is prior to the standard time (15:00), namely $9<T<15$, and the updated storage of the accumulator A is minus, the ALU allows the flag S to store a logic "1".

In step 154, ALU enquires if the flag S carries a logic "1" and, if it does, it means that the current time has not reached the standard time as yet. Then, in step 155, a coded signal "11111000" representing the availability of all the transaction modes is temporally stored in the accumulator A by a direct instruction. If, on the other hand, the flag S does not carry a logic "1", the current time is past the standard time ($15<T<17$) and, therefore, the deposit mode is shut down in accordance with the banking schedule. In step 156, a coded signal "10111000" representing the availability of all the modes but the deposit mode is temporally stored in the accumulator. From step 155 or 156, the sequence proceeds to the step 102 shown in FIG. 5 and all the subsequent operations are similar to those hereinbefore described by reference to FIG. 5.

It should be understood that while, in the embodiments described hereinbefore, a micro-processor is used in combination with soft ware, the corresponding functions and processes may be performed by means of hardware circuitry. It should also be understood that the above description is merely illustrative of this invention and that many changes and modifications may be made by those skilled in the art without departing from the scope of the appended claims. Thus, for example, the apparatus according to this invention may be further provided with means whereby the pattern of transactions representing a combination of modes processable by the machine prevails over the pattern of transactions manually pre-set by the bank employee when the two patterns happen to be not in agreement.

We claim as our invention:

1. A banking apparatus comprising a common housing accommodating a plurality of transaction devices some of which have at least one common operative device, means for presetting a pattern of transactions representing a combination of transactions processable according to the status of said plurality of transaction devices, means connected with said means for presetting said pattern of transactions for generating a first predetermined signal pattern representative of the status of said plurality of transaction devices, means for entering a customer selected transaction into said apparatus, means connected with said means for entering for generating a second predetermined signal pattern representative of said customer selected transaction, means connected with said first and second means for generating for checking for the presence or absence of a predetermined relation between said first and second predetermined signal patterns and for judging whether said customer selected transaction is processable and means connected with said means for checking and with said plurality of transaction devices for operating a selected one of said transaction devices to execute said customer selected transaction which has been judged to be available by said judging means.

2. A banking apparatus according to claim 1, wherein said means for generating said first predetermined signal pattern and said means for generating said second predetermined signal pattern generate signals each consisting of a plurality of bit positions each containing a logical "1" or "0" state and said predetermined relation is present when each bit position logic state of said first signal pattern matches a corresponding bit position logic state of said second signal pattern.

3. A banking apparatus according to claim 1, wherein said plurality of transaction devices include at least cash withdrawal, deposit, exchange, balance reference and entry transaction devices.

4. A banking apparatus according to claim 1, wherein said presetting means is automatically activated when any one of said plurality of transaction devices has failed.

5. A banking apparatus according to claim 1, wherein said presetting means is manually actuated from outside of said housing to pre-set one or more patterns of available transactions.

6. A banking apparatus according to claim 4, wherein said apparatus includes means for detecting a malfunction of any one of said plurality of transaction devices, means responsive to said means for detecting for generating an information output signal representing available transactions and means responsive to said information output signal for feeding said information output signal to said pre-setting means.

7. A banking apparatus according to claim 1, further comprising means for providing banking service time schedule data to said pre-setting means, said pre-setting means being responsive to said time schedule data to set at least one pattern of transactions in accordance with said time schedule data.

8. A banking apparatus according to claim 1, further comprising means responsive to said judging means for indicating to a customer which customer selected transactions are processable when said checking and judging means has judged that said customer selected transaction is not available.

9. A banking apparatus according to claim 1, wherein said common operative device comprises at least a means for entering a customer card into said apparatus for verification.

10. A banking apparatus according to claim 9, wherein said customer card entering means accepts a customer card prior to entry of said customer selected transaction and returns the card when a customer selected transaction has been judged not available and when a customer selected transaction has been completed by said executing means.

11. A banking apparatus according to claim 1, wherein said presetting means is an operation mode switch, said first predetermined signal pattern generating means is an encoder associated with said operation mode switch, said means for entering a customer selected transaction is a customer select switch, said second predetermined signal pattern generating means is an encoder associated with said customer select switch, and said checking and judging means is a micro-processor including a memory receiving output data from said encoders.

12. A banking apparatus according to claim 1, wherein said common operative device comprises at least one of a magnetic card reader, a slip issuing device, an imprinter, a bank note dispenser, a bank note checker and a bankbook printer.

13. A banking apparatus according to claim 5, further comprising means for causing a pattern of transactions representing a combination of available transactions which are processable to appear in said first predetermined signal pattern in preference to a pattern of transactions manually preset when the pattern of transactions which are available and the pattern of transactions manually preset disagree.

* * * * *